March 29, 1960     W. TAYLOR     2,930,971
APPARATUS FOR DETECTING DISCONTINUITIES IN FERROUS METALS
Filed June 3, 1955     3 Sheets-Sheet 1
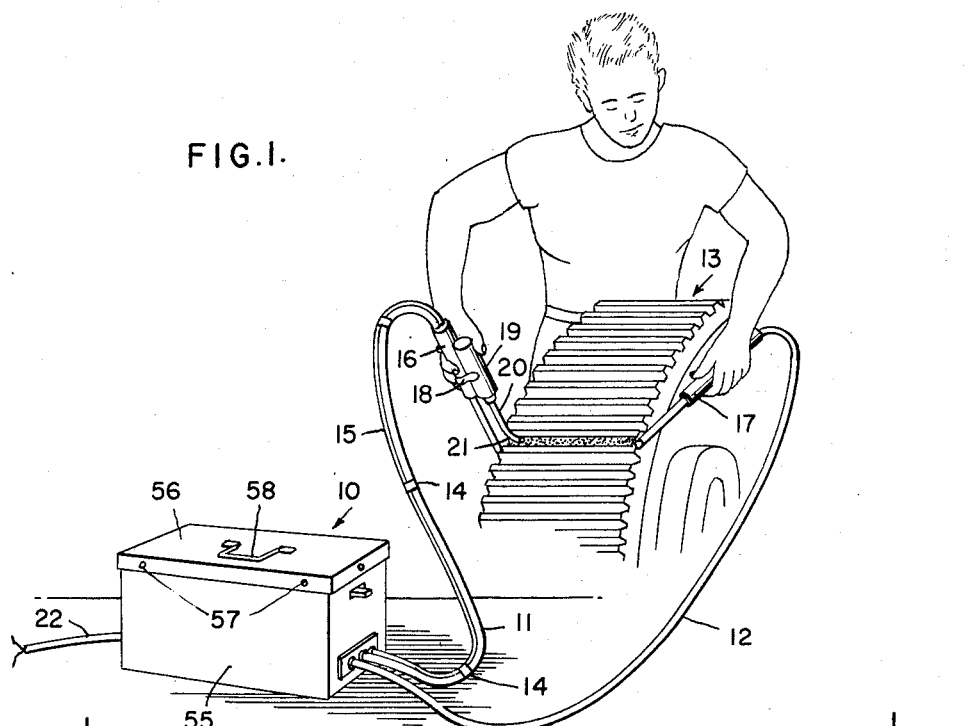
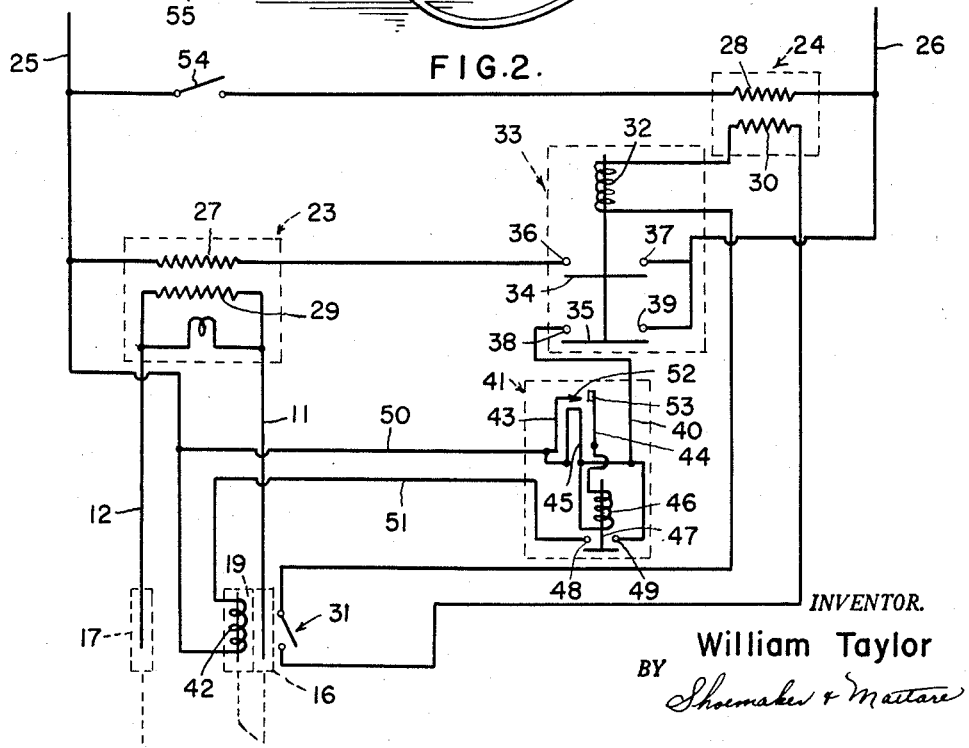
INVENTOR.
William Taylor
BY Shoemaker & Mattare
ATTYS

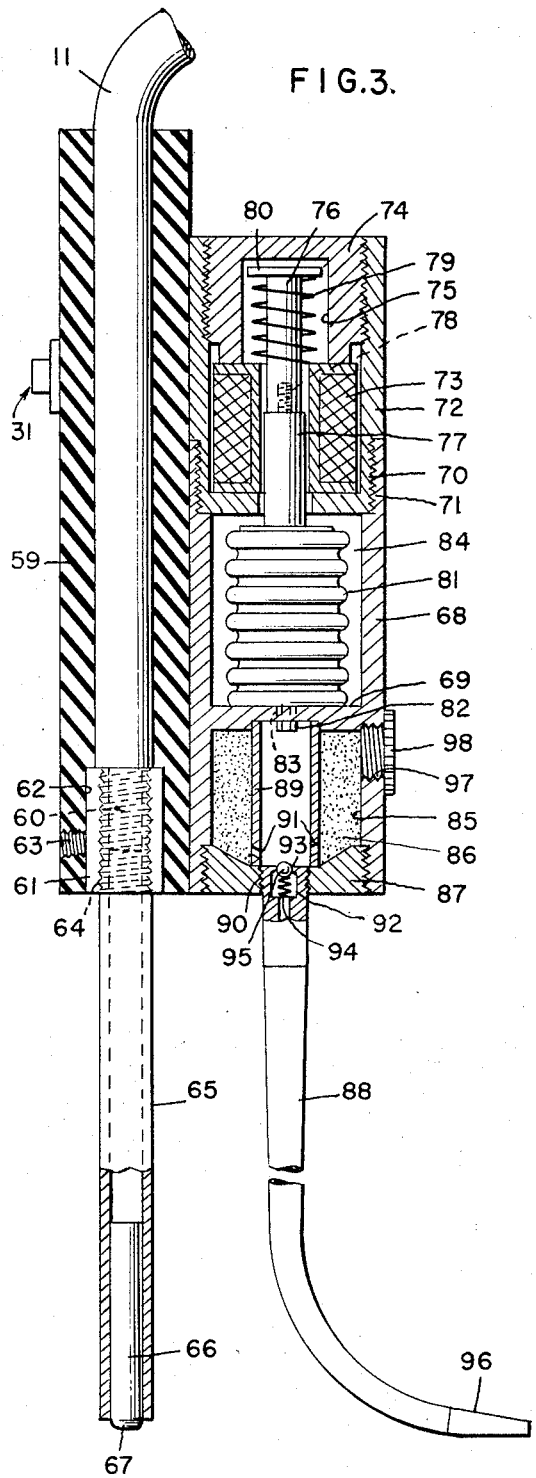
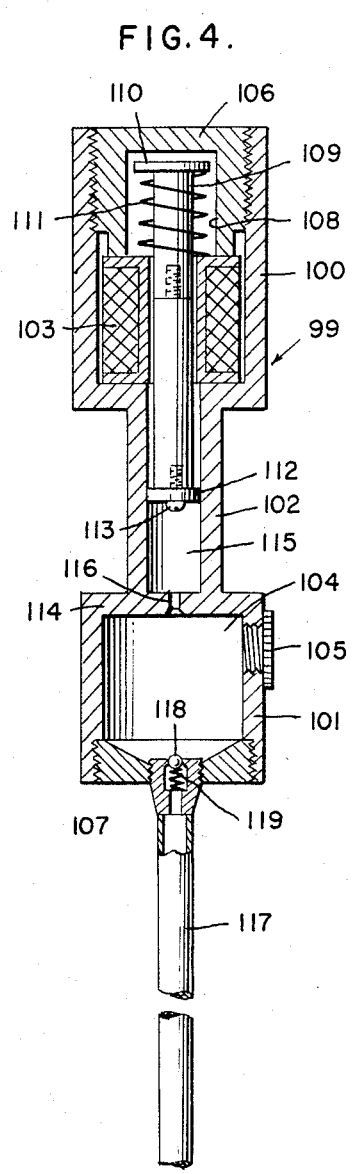

March 29, 1960 W. TAYLOR 2,930,971
APPARATUS FOR DETECTING DISCONTINUITIES IN FERROUS METALS
Filed June 3, 1955 3 Sheets-Sheet 3
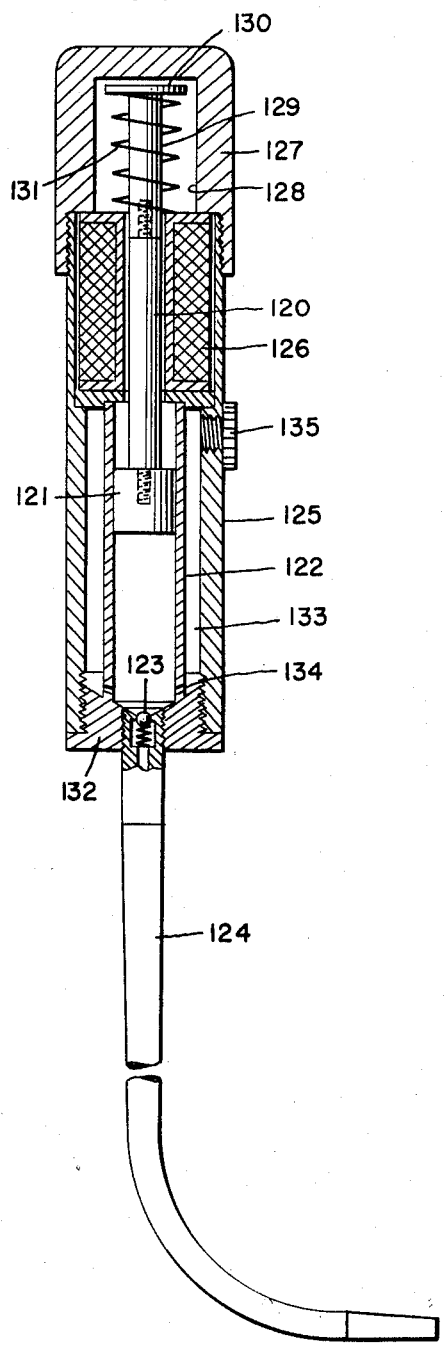
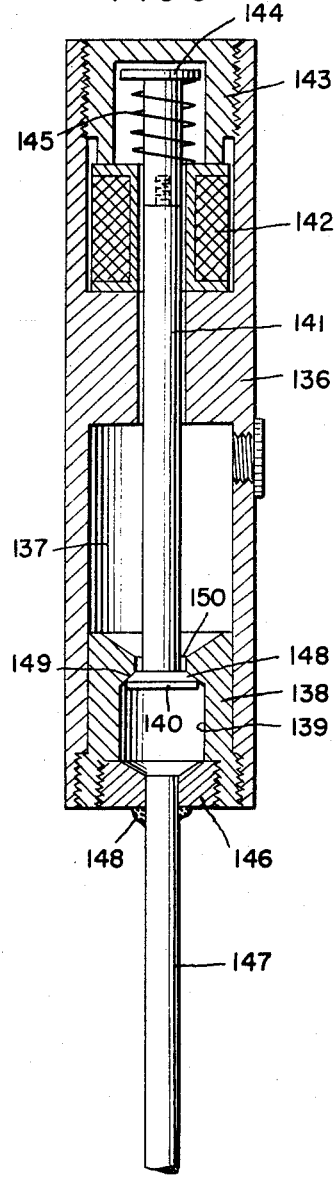
INVENTOR.
William Taylor
BY
ATTYS

United States Patent Office 2,930,971
Patented Mar. 29, 1960

2,930,971

APPARATUS FOR DETECTING DISCONTINUITIES IN FERROUS METALS

William Taylor, Norfolk, Va.

Application June 3, 1955, Serial No. 513,074

7 Claims. (Cl. 324—38)

This invention relates to apparatus for detecting discontinuities in ferrous metals and pertains more particularly to portable apparatus for the purpose described.

At the present time there are machines on the market which are capable of detecting surface or sub-surface discontinuities in ferrous metals, but these machines all have one common feature which renders them inaccessible to small shops and the like, namely, their large size and high initial cost. Further, these machines usually operate on a rather high voltage. It is, therefore, a primary object of this invention to provide apparatus for detecting discontinuities in ferrous metals which is characterized by its light weight and by its utilization of an input voltage of 110 volts A.C.

This invention, by virtue of its light weight and the fact that it can be operated from any conventional 110 volt A.C. source, enables the apparatus to perform its function anywhere the source of electrical input is available and it enables the device to be easily carried about from place to place for testing metals or structures at desired points.

Another object of this invention is to provide a portable light weight apparatus for detecting discontinuities in ferrous metals which is characterized by the provision of a dispensing mechanism carried by one of its electrodes which is operated from the same source as is the electric field established in the electrode such that a predetermined quantity of finely divided magnetizable material will be dispensed from the dispenser over the surface of the material being tested whereby the powder will be acted upon by the electric field established between the electrodes to detect surface or sub-surface discontinuities in the material.

A further object of this invention is to provide apparatus in accordance with the preceding objects wherein a control switch is located on the electrode carrying the dispenser wherein the control switch energizes common electric circuit means for establishing the electric field between the electrodes and for operating the dispenser.

Another object of this invention lies in the provision of apparatus for detecting discontinuities in ferrous metals wherein electric circuit means is provided for estabilshing an electric field between two electrodes which are placed in engagement with a mass of material to be tested and wherein one of the electrodes has connected thereto a dispensing device for automatically spreading a quantity of finely divided magnetizable material over the surface of the material to be tested between the electrodes, there being electric circuit means which includes a control switch on one of the electrodes for energizing the electrodes and estabilshing the electric field therebetween and a time delay mechanism responsive to actuation of the control switch for operating the dispenser a predetermined length of time after the control switch has been actuated to permit the mass of material being tested to be saturated by the electric field between the electrodes.

Still another object of this invention is to provide apparatus in accordance with the preceding objects wherein the dispenser is characterized by operating means therefor which includes a solenoid with a movable core, which solenoid operates upon energization thereof to displace the movable core and cause the finely divided magnetizable material to be dispensed and spread over the surface of the work being tested.

Another object of this invention is to provide dispensing mechanism for apparatus of the character described wherein the dispenser incorporates a bellows operated by the movable core of a solenoid to dispense the finely divided magnetizable material therefrom.

Still another object of this invention is to provide a dispensing mechanism for use with the apparatus above described wherein the dispenser includes operating means therefor in the form of a solenoid having a movable core in which the core operates within a cylinder to force a quantity of the finely divided magnetizable material from the dispenser and spread the same over the surface of the material being tested.

A still further object of the invention is to provide a dispenser mechanism in accordance with the preceding object wherein the movable core in its at rest position operates as a valve between a reservoir for the finely divided magnetizable material and the cylinder such that when the core of the solenoid has been moved to its dispensing position the magnetizable material may flow into the cylinder from the reservoir.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of the device in operation;

Fig. 2 is a circuit diagram showing a preferred embodiment of the invention;

Fig. 3 is an enlarged sectional view taken through the electrode and dispenser assembly shown in Fig. 1 and showing details of internal construction;

Fig. 4 is an enlarged sectional view taken through a modified from of dispenser;

Fig. 5 is a view similar to Fig. 4 but showing a still further modified form of dispenser; and Fig. 6 is a sectional view taken through another modified form of dispenser.

Referring at this time more particularly to Fig. 1, the apparatus for detecting discontinuities in ferrous metal will be seen to consist essentially of a carrying case indicated generally by the reference character 10 which carrying case contains the various electrical components hereinafter described for operating the device. Issuing from the carrying case 10 are a pair of conductors 11 and 12 which as illustrated are of sufficient gauge to carry a low voltage, high amperage alternating current for the purpose of establishing the necessary electrical field in the material to be tested, which material in Fig. 1 is indicated generally by the reference character 13. Also issuing from the carrying case 10 and connected to one of the conductors 11, as by the suitable clip members 14, is a further conductor 15 the purpose and function of which will be presently apparent.

Connected respectively to the conductors 11 and 12 at the ends thereof remote from the carrying case 10 are the electrode members 16 and 17, the details of which will be presently described. Connected to the electrode 16, as by a suitable clip or connector strap 18, is dispenser 19 and it will be noted that the dispenser has a nozzle portion 20 which terminates in a laterally directed end portion 21 for the purpose of spreading a quantity of finely divided magnetizable material from the nozzle over the surface of the work being tested. Connected to the carrying case 10 is an input conductor 22 which is of the two-conductor type and terminates in an end, not shown, having a common plug thereon for the purpose of connection to any conventional electrical outlet.

It is to be understood that this invention is intended to be operated from any conventional source of alternating electric current of 110 volts although it is also to be understood that the assembly can be so designed as to operate from other higher or lower voltages. Also, the device is operable on 60 cycle current although it can be operated on higher or lower frequencies.

As shown in Fig. 1, the electrodes 16 and 17 are placed in engagement at spaced points on the surface of the work 13 which in this case is illustrated as being a bull gear of the type used in the reduction gearing of ships. A control switch hereinafter described is manipulated by the operator, which control switch functions to energize the electrodes 16 and 17 such that a low voltage, high amperage current flows in the work 13 between the electrodes and establishes an electric field therein. The control switch also serves to operate the dispenser 19, which dispenser spreads a quantity of magnetizable material across the work surface between the electrodes. As is well known, any surface or sub-surface discontinuity in the ferrous metal of the work 13 between the electrodes will be detected by virtue of the fact that the finely divided magnetizable material will build up on the surface of the work over the discontinuity, thereby permitting the operator to visually observe any defects in the work 13.

For best results it is preferred that the dispensing mechanism be energized to spread the finely divided magnetizable material a few seconds after the electrical field has been originated in the work piece. This permits the work piece to become saturated with the electric field and permits the magnetic field around the discontinuity to build up to sufficient strength as to most effectively cause the building up or piling up of the magnetizable material.

Referring now more particularly to Fig. 2, the carrying case 10 has disposed therein a main transformer member indicated generally by the reference character 23 as well as a secondary transformer member indicated generally by the reference character 24. The 110 volt alternating current input conductors are indicated by the reference characters 25 and 26 and it will be seen that both the main and secondary transformers 23 and 24 are connected across these conductors such that the primary windings 27 and 28 respectively thereof carry the full 110 volts.

The secondary winding 29 of the main transformer has a suitable number of turns thereon to produce a low voltage, high amperage current and in actual practice the voltage of the secondary may be in the neighborhood of 1½ to 10 volts. The secondary winding 30 of the transformer 24 has an output voltage of 6 volts and the output thereof operates the various controls in the electric circuit of the apparatus. The secondary 30 has connected thereto a control switch indicated generally by the reference character 31 and in series with this circuit is a core 32 of a relay assembly indicated by the reference character 33. The relay 33 has two movable contact members 34 and 35 which are normally disposed in an open position and are closed when the core 32 is energized. The contact 34 operates to electrically connect the fixed contact members 36 and 37 which establishes electrical connection of the primary winding 27 of the main transformer 23 across the input conductors 25 and 26. The movable contact 35 operates to bridge between a pair of fixed contacts 38 and 39 and thus establish a control circuit for the dispenser 19. This control circuit is connected at one side directly to the conductor 26 and at its other side is connected by a conductor 40 to a time delay mechanism indicated generally by the reference character 41. The time delay mechanism permits the electrodes 16 and 17 to be energized a few seconds prior to the operation of the dispenser and it will be noted that the electrodes are connected to opposite sides of the secondary winding 29 of the main transformer 23 through the previously mentioned conductors 11 and 12.

The dispenser 19 includes a solenoid winding 42 which when energized operates the dispenser to spread the magnetizable material across the work surface and the details of the timing mechanism 41 may include bimetallic contact members 43 and 44 and an associated heater element 45 to close the contacts 43 and 44 to complete the circuit through a relay winding 46 which in turn operates the relay core 47 to establish connection between the fixed contacts 48 and 49 and complete the circuit to the dispenser solenoid core winding 42 through the conductors 50 and 51. Thus when the control switch 31 is actuated, the electrodes 16 and 17 are immediately energized as is the circuit through the heater element 45 of the timing mechanism 41. After a few seconds, the heater 45 will have raised the temperature of the bimetallic strips 43 and 44 to such a point that the contacts 52 and 53 thereof engage to complete the circuit through the relay coil or winding 46 which immediately establishes connection between the contacts 48 and 49 and thus energize the dispenser solenoid winding 42.

The control or secondary transformer 24 may have associated therewith a switch 54 for the purpose of turning the device on or off.

It is to be understood that any suitable form of timing mechanism 41 may be employed, the specific structure shown being merely for illustrative purposes and not intended to be limiting in any way.

As shown most clearly in Fig. 1, the carrying case 10 is preferably constructed of the main body portion 55 which is provided with the top 56 secured to the body as by the screw fastening members 57. The top 56 of the carrying case is preferably provided with a handle member 58 for convenience in transporting the device from place to place.

As compared to present machines which are portable only to the extent that they can be moved by special heavy equipment, the instant device is characterized by the weight of the carrying case assembly which is less than 25 pounds. The weight of the conductors 11 and 12, the associated electrodes 16 and 17 and the dispenser 19 may be less than 10 pounds such that the overall weight of the device is less than 30 or 35 pounds. From this it can be easily seen that the device is readily portable and can be carried from place to place at the will of the user and may be utilized to test material at any point which is accessible to the operator.

Reference is had now more particularly to Fig. 3 wherein one of the electrodes and the associated dispenser are shown. The dispenser will be seen to consist of an elongate tubular body portion 59 which is formed of suitable insulative material which receives the previously mentioned conductor 11. The conductor 11 is, of course, provided with an outer layer of insulation and the conducting portion thereof may be preferably formed of multi-strand wire. The conductor 11 is projected substantially entirely through the body 59 and the conductor portion 60 thereof is connected with a sleeve member 61 which is received in a counterbored portion 62 of the body 59. The sleeve is held in place within the counterbore by means of a set screw member 63 as will be obvious. The sleeve 61 is provided with a longitudinal bore therethrough which receives the metallic conductor portion 60 of the conductor 11 and which is internally screw threaded in a manner indicated by the dotted lines 64.

An elongate tube 65 preferably formed of copper is externally screw threaded and engaged with the bore of the sleeve 61 in the manner shown, and thus tube extends axially from the body 59. The free end of the tube 65 is filled with a quantity of solder 66 which has a tip end 67 projecting somewhat beyond the end of the tube 65 as will be readily apparent. The purpose of this construction is to permit the tip end 67 of the solder to be engaged against the work piece rather than the tube 65 itself. With this construction, if there is any arcing between the electrode and the work piece, the solder tip 67 will be burned rather than the surface of the work piece since the solder is of very low melting point. The body member 59 has mounted thereon the previously mentioned control switch 31 as will be clearly evident from Fig. 3.

The dispenser mechanism as previously described is carried by the electrode by any suitable clip or fastening strap element and the dispenser will be seen to consist of a hollow body portion 68 having a transverse partition wall 69 therein. This body is open at both ends and at its upper end is provided with a counterbore 70 which receives the step portion 71 of the solenoid case member 72. The case 72 contains the solenoid winding 73 and has a plug 74 in its opposite end in the manner shown. The plug is recessed as indicated at 75 which receives the upper end portion 76 of the solenoid core 77. The core as shown may be, if desired, formed of two-piece construction threadedly interengaged as at 78 although, of course, the construction may be integral if desired. The solenoid core is projected through the winding 73 in the conventional manner and is movable therein, there being provided a compression spring member 79 which engages at one end against the winding 73 and at its opposite end against the enlarged portion 80 of the core so as to normally urge the solenoid core to the uppermost position shown in Fig. 3. Upon energization of the solenoid winding the solenoid core moves downwardly in opposition to the spring 79 to compress the bellows member 81 which is connected rigidly to the extreme lower end of the movable core. The opposite end of the bellows seats upon the previously mentioned partition wall 69 and it is preferred that the bellows be provided with a nozzle portion 82 which projects through an opening 83 in the partition wall. The partition wall separates the body 68 of the dispenser into the upper chamber 84 containing the bellows 81 and the lower chamber 85 which forms a reservoir for a supply of finely divided magnetizable material 86. A plug member 87 is inserted within the lower end of the dispenser body 68 and is provided with a threaded aperture receiving one end of the dispensing nozzle 88 and the plug 87 also serves to position a cylinder member 89 between the plug and the partition wall 69. The cylinder 89 provides a dispensing chamber 90 concentrically of the lower chamber 85 in the dispenser body and the lower end of the cylinder is provided with suitable apertures 91 communicating with the surrounding annular reservoir chamber 85 so that a predetermined quantity of magnetizable material 86 may flow into the lower end portion of the cylinder. The nozzle 88 is provided with a recess 92 communicating with the cylinder chamber 90 through the restricted orifice 93 and disposed within the recess 92 is a compression spring member 94 operating against the ball check member 95 which seats within the restricted orifice 93 to normally close the connection between the chamber 90 and the nozzle 88. However, the compression spring 94 is not sufficiently strong to overcome the pressure from the bellows 81 when the solenoid core is operated and thus the predetermined quantity of magnetizable material which is in the cylinder chamber 90 will be dispensed outwardly through the nozzle over the surface of the work when the bellows is operated. For this purpose, it will be noted that the tip end 96 of the nozzle 88 is bent laterally so as to be most conveniently placed for spreading the magnetizable material when the electrode is disposed substantially at right angles to the work surface.

The reservoir chamber 85 of the dispensing body is provided with a threaded opening 97 having engaged therein a filler plug member 98 for the purpose of readily filling the chamber when needed.

Referring now more particularly to Fig. 4, a modified form of dispenser assembly will be seen to consist of an elongate hollow body indicated generally by the reference character 99 which includes upper and lower enlarged portions 100 and 101 and an intermediate reduced portion 102. The upper portion 100 houses a solenoid winding 103 whereas the lower portion 101 provides a chamber 104 which is to be filled with a supply of magnetizable material. The supply of material can be replenished from time to time by unscrewing the filler plug member 105 similar to the previously mentioned plug member 98.

Both the upper and lower ends of the body 99 are open and receive the respective plug members 106 and 107. The plug member 106 is recessed as at 108 to receive the upper end portion 109 of the solenoid core and similar to the mechanism described in connection with Fig. 3, the core is provided with an enlarged head 110 and a compression spring 111 seating thereagainst to normally hold the movable core in the position shown. The lower end of the movable core is provided with an enlarged piston member 112 which may be secured to the core as by the screw threaded member 113 and when the core is in the at rest position, the piston 112 is disposed somewhat above the wall portion 114 which separates the piston chamber 115 from the reservoir chamber 104. The wall 114 is provided with an aperture 116 therethrough so that when the core is moved downwardly, the air displaced within the chamber 115 may be forced through the aperture 116 and consequently cause a quantity of magnetizable material to be dispensed through the nozzle 117. The nozzle 117 is threaded engaged with the plug member 107 and has provided therein a check valve in the form of a ball 118 and the associated spring 119 so as to normally retain the magnetizable material within the chamber 104. Since the stroke of the solenoid core remains constant, the same amount or quantity of magnetizable material will be dispensed upon each operation of the device and the stroke of the solenoid core is determined such as to effect the dispensing of the proper amount of material.

The construction shown in Fig. 5 is similar generally to the arrangement shown in Fig. 4 in that the solenoid core 120 has engaged at its lower end a piston member 121 which is movable within a cylinder member 122 to dispense a predetermined quantity of magnetizable material past the ball check member 123 and through the nozzle 124 over the work surface. However, in this case the dispenser body 125 is constructed somewhat differently and houses at its upper end the solenoid winding 126 and is provided with a cap member 127 threadedly engaged therewith, which cap member is recessed at 128 to receive the upper end 129 of the solenoid core in the manner shown. The solenoid core terminates at its upper end in the enlarged portion 130 which cooperates with the spring 131 to normally maintain the core 120 in the position shown in Fig. 5. The lower end of the body 125 is closed by means of the plug member 132 which carries the nozzle 124 and thus plug member will be seen to include the previously mentioned cylinder 122 within which the piston 121 operates, the cylinder being of such length as to engage and seat upon the lower surface of the solenoid winding assembly. The cylinder 122 is spaced concentrically within the body 125 and for that reason provides an annular reservoir chamber 133 within which the supply of magnetizable material is contained. Adjacent the main body of the plug 132 the cylinder 122 is provided with apertures 134 communicating with the member 133 and permitting a predetermined quantity of magnetizable material to flow into the lower end portion of the cylinder. Of course, the filler plug member 135 is associated with the dispenser body to permit the chamber 133 to be replenished from time to time.

Fig. 6 shows a further modification of the dispenser assembly which is characterized by the provision of component parts which will permit the operator to control the amount of material to be dispensed therefrom. To this end, the body 136 of the dispenser is provided with a reservoir chamber 137 above a plug member 138 which plug member is provided with a recess 139 forming the dispensing chamber within which the enlarged lower end 140 of the solenoid core 141 operates. The upper end of the body 136 is recessed to house the solenoid winding assembly 142 and receive the plug member 143 which in turn is recessed to receive the enlarged upper end 144 of the solenoid core and the compression spring 145 operating thereagainst.

The plug 138 receives the head portion 146 of the nozzle 147, these two members being joined as by the brazing 148 and the dispensing chamber 139 communicates directly with the nozzle in the manner shown. The enlarged portion or piston portion 140 of the solenoid core is of slightly less diameter than the internal diameter of the chamber 139 to permit the finely divided magnetizable material to flow around the piston and be disposed therebeneath for subsequent dispensing when the core is moving from its dispensing position back to its normal position. The upper surface 149 of the piston 140 is conical as shown and seats against the conical under surface 149 so that when the solenoid core is in its normal position no magnetizable material may flow from the reservoir chamber 137 into the dispensing chamber 139. However, when the control is actuated and the solenoid core 141 moves downwardly to dispense the material within the dispensing chamber 139 through the nozzle 147 and onto the work surface, the material in the reservoir chamber 137 may flow into the dispensing chamber 139 since there is a slight clearance between the solenoid core 141 and the aperture through the plug 138, this clearance being indicated in Fig. 6 by the reference character 150. This clearance permits a predetermined flow rate of magnetizable material and it will be readily evident that the longer the control switch 31 is maintained closed, the more material will flow into the reservoir chamber 139 to be dispensed upon the next succeeding operation. Thus, the operator can control the amount of material which will be dispensed during the next operation by merely controlling the length of time that he maintains the switch 31 in closed position. Consequently, if the operator desires that a large quantity of magnetizable material be dispensed during the next operation, he has merely to maintain the control switch 31 closed by finger manipulation a greater length of time than he would normally do so. This is particularly advantageous when the testing of the ferrous metal takes place in such a manner that a relatively large area of work surface is involved. On the other hand, if a series of relatively small work surfaces are to be tested, the operator can control the quantity of material to be dispensed to such an extent that there will be no overabundance of magnetizable material on the work surface.

In the operation of the device, it will be apprecitaed that the detection of discontinuity in the metal can be determined at the instant the dispensing mechanism is actuated and it is not necessary to maintain the electric field within the work after the dispensing operation. However, it may be desired at times to permit greater or lesser time delay between the establishment of the electric field within the work and the operation of the dispenser, this depending upon the size and mass of the work, and for this reason it will be appreciated that the timing mechanism 41 may be changed so as to cause a greater or lesser time delay. However, actual test has indicated that the optimum time delay is between three to five seconds for substantially all work pieces.

The devices being portable, permits the operator to go directly to the site at which the work piece is located and does not necessitate the work piece being carried to the device. For this reason the testing operation is materially expedited over and above current operations.

The construction of the device wherein the powder dispenser is carried by one of the electrodes and is operated automatically in conjunction with the energization of the electrodes, permits the device to be operated by one man and the actual testing operation takes but a few moments of time. The dispenser with the nozzle attached insures that the magnetic powder will be spread evenly across the surface of the material being tested and also insures a relatively high velocity of the dispensed powder which is extremely important in preventing excess powder clinging to the work surface and hence enables the powder to be distributed in such a manner as to produce an optimum pattern in which any surface or subsurface discontinuities can be easily and readily detected.

I claim:

1. Apparatus for detecting discontinuities in ferrous metals comprising a light weight portable carrying case, electric circuit means supported within said carrying case, switch means connected in said circuit for energizing the circuit, a pair of flexible insulated electrically conductive conduits having one end portion thereof connected to said electric circuit, an electrode connected to the opposite end portion of each of said conduits for engaging a mass of material to be tested, at least one of said electrodes having a hollow elongate body supported thereby, said body having formed therein a reservoir for receiving finely divided magnetizable material, means supported within said body for dispensing the finely divided magnetizable material, and means connecting said dispensing means with a portion of said electrical circuit for causing actuation of the dispensing means upon energization of said electrical circuit.

2. Apparatus as defined in claim 1 wherein said dispensing means includes a dispensing nozzle supported by said body and in communication with the interior thereof, said nozzle being directed laterally away from the adjacent electrode and projecting downwardly from the body substantially the same vertical distance as said electrode projects downwardly below the body whereby when the electrode is in engagement with the mass of material being tested, the nozzle is disposed in proper operative position for dispensing the magnetizable material.

3. Apparatus for detecting discontinuities in ferrous metals comprising a pair of electrodes for engagement at spaced points upon a mass of ferrous metal to be tested, a hollow body supported by at least one of said electrodes, said body having reservoir means therein for storing finely divided magnetizable material, dispenser means disposed within said hollow body for dispensing finely divided magnetizable material from the body onto the surface of the tested mass between the electrodes, electric circuit means connected to said electrodes for establishing an electric field within the tested mass between the electrodes, said electric circuit having a control switch connected therein for immediately energizing said electrodes, and a time delay circuit connected in said electrical circuit, said time delay circuit being connected to said dispensing means for operating the dispensing means a predetermined time after actuation of said control switch whereby the electric circuit is first established through the tested mass, and the finely divided magnetizable particles are subsequently dispensed upon the surface of the tested mass.

4. Apparatus as defined in claim 3 wherein said electric circuit has connected therein power input means operable with a 110 volt electrical source.

5. Apparatus for detecting discontinuities in ferrous metals comprising a pair of electrodes for engagement at spaced points upon a mass of ferrous metal to be tested, a hollow body supported by at least one of said electrodes, said hollow body having means therein for receiving a quantity of finely divided magnetizable material, said body also supporting therein dispensing means for dispensing the magnetizable material therein, an electric circuit means connected to said electrodes for establishing an electric field within the tested mass between the electrodes, said electric circuit including a transformer having output means providing 6 volts of electric energy, a control switch and a time delay circuit connected to the output of said transformer, said control switch being connected to said electrodes for immediately energizing said electrodes, and said time delay circuit being connected to said dispensing means for operating the dispensing means a predetermined time after actuation of the control switch and associated electrodes.

6. Apparatus for detecting discontinuities in ferrous metals comprising means for establishing an electric field within and over a surface portion of a metal to be tested, and means for spreading a quantity of finely divided magnetizable material over said surface portion in response to the establishment of the electric field, said last means including an elongate body, a solenoid winding mounted in said body, a core movably mounted in said body and projecting through said winding, said body having an apertured partition wall therein, a bellows seated upon said partition and having a nozzle portion projecting through said aperture, a nozzle projecting from the body and terminating at one end in spaced relation to said partition wall, a cylinder extending between said nozzle and partition wall to form a dispensing chamber, said body being hollow around said cylinder to provide a reservoir, said cylinder having a plurality of openings therethrough communicating with the reservoir.

7. Apparatus for detecting discontinuities in ferrous metals comprising means for establishing an electric field within and over the surface portion of the metal to be tested, means for spreading a quantity of finely divided magnetizable material over said surface portion in response to the establishment of the electric field, said last means including a hollow elongate body, a solenoid winding mounted in said body, a core movably mounted in said body and projecting through said winding, a plug member disposed within said body member defining a reservoir chamber therein immediately adjacent said plug member, said plug member having a recess forming a dispensing chamber therein, said plug member having an orifice formed therein providing communication between said reservoir chamber and said dispensing chamber, the surface of said dispensing chamber adjacent said orifice being of substantially conical configuration, the lower end of said core having an enlarged piston portion having an upper substantially conical surface for engagement with the substantially conical portion of the plug member, said core being spaced from the walls of said orifice for providing clearance therebetween.

References Cited in the file of this patent
UNITED STATES PATENTS

| | | |
|---|---|---|
| 1,514,492 | Wille | Nov. 4, 1924 |
| 1,553,543 | Lincoln | Sept. 15, 1925 |
| 2,334,827 | Lyons | Nov. 23, 1943 |
| 2,430,167 | Fitch | Nov. 4, 1947 |
| 2,587,476 | Huhn | Feb. 26, 1952 |
| 2,614,731 | White | Oct. 21, 1952 |
| 2,644,921 | Lewkowski | July 7, 1953 |
| 2,682,032 | Dehn et al. | June 22, 1954 |
| 2,705,093 | Carter | Mar. 29, 1955 |
| 2,800,256 | Nuzzo | July 23, 1957 |